(12) United States Patent
Philippin et al.

(10) Patent No.: US 10,286,509 B2
(45) Date of Patent: May 14, 2019

(54) MACHINE FOR MACHINING WORKPIECES, CORRESPONDING ARRANGEMENT AND METHOD FOR MACHINING WORKPIECES

(71) Applicant: GLEASON-PFAUTER MASCHINENFABRIK GMBH, Ludwigsburg (DE)

(72) Inventors: Matthias Philippin, Rutesheim (DE); Kurt Kleinbach, Ludwigsburg (DE); Arrigo Mellini, Casalecchio di Reno (IT); Ugo Mattioli, Casalecchio di Reno (IT)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 123 days.

(21) Appl. No.: 15/328,917

(22) PCT Filed: Jul. 16, 2015

(86) PCT No.: PCT/EP2015/001468
§ 371 (c)(1),
(2) Date: Jan. 25, 2017

(87) PCT Pub. No.: WO2016/012085
PCT Pub. Date: Jan. 28, 2016

(65) Prior Publication Data
US 2017/0209971 A1    Jul. 27, 2017

(30) Foreign Application Priority Data
Jul. 25, 2014  (DE) .................. 10 2014 011 145

(51) Int. Cl.
*B23F 5/16*       (2006.01)
*B23Q 5/027*   (2006.01)
(Continued)

(52) U.S. Cl.
CPC ............... *B23Q 5/027* (2013.01); *B23F 5/16* (2013.01); *B23F 23/12* (2013.01);
(Continued)

(58) Field of Classification Search
CPC ... Y10T 409/10477; Y10T 409/105088; Y10T 409/105247; Y10T 409/105406;
(Continued)

(56) References Cited

U.S. PATENT DOCUMENTS

| 1,662,109 A | | 3/1928 | Fellows | |
| 2,055,132 A | * | 9/1936 | McLeod | ................. B23F 5/166 409/35 |

(Continued)

FOREIGN PATENT DOCUMENTS

| DE | 2127043 A1 | 12/1972 |
| DE | 2749079 A1 | 7/1978 |

(Continued)

OTHER PUBLICATIONS

EPO machine translation of WO 2015-146661, printed Jul. 2018.*
(Continued)

*Primary Examiner* — Daniel W Howell
(74) *Attorney, Agent, or Firm* — Robert L. McDowell

(57) ABSTRACT

The invention relates to a machine for the gear cutting machining of workpieces, in particular a gear shaping machine, comprising a spindle for holding a machining tool, and a drive by means of which the spindle can be rotationally driven about its spindle axis, and further comprising an arrangement. When said arrangement is actuated, a spindle rotation caused by the drive changes the axial relative position with respect to the spindle axis.

10 Claims, 4 Drawing Sheets

Figure 1:
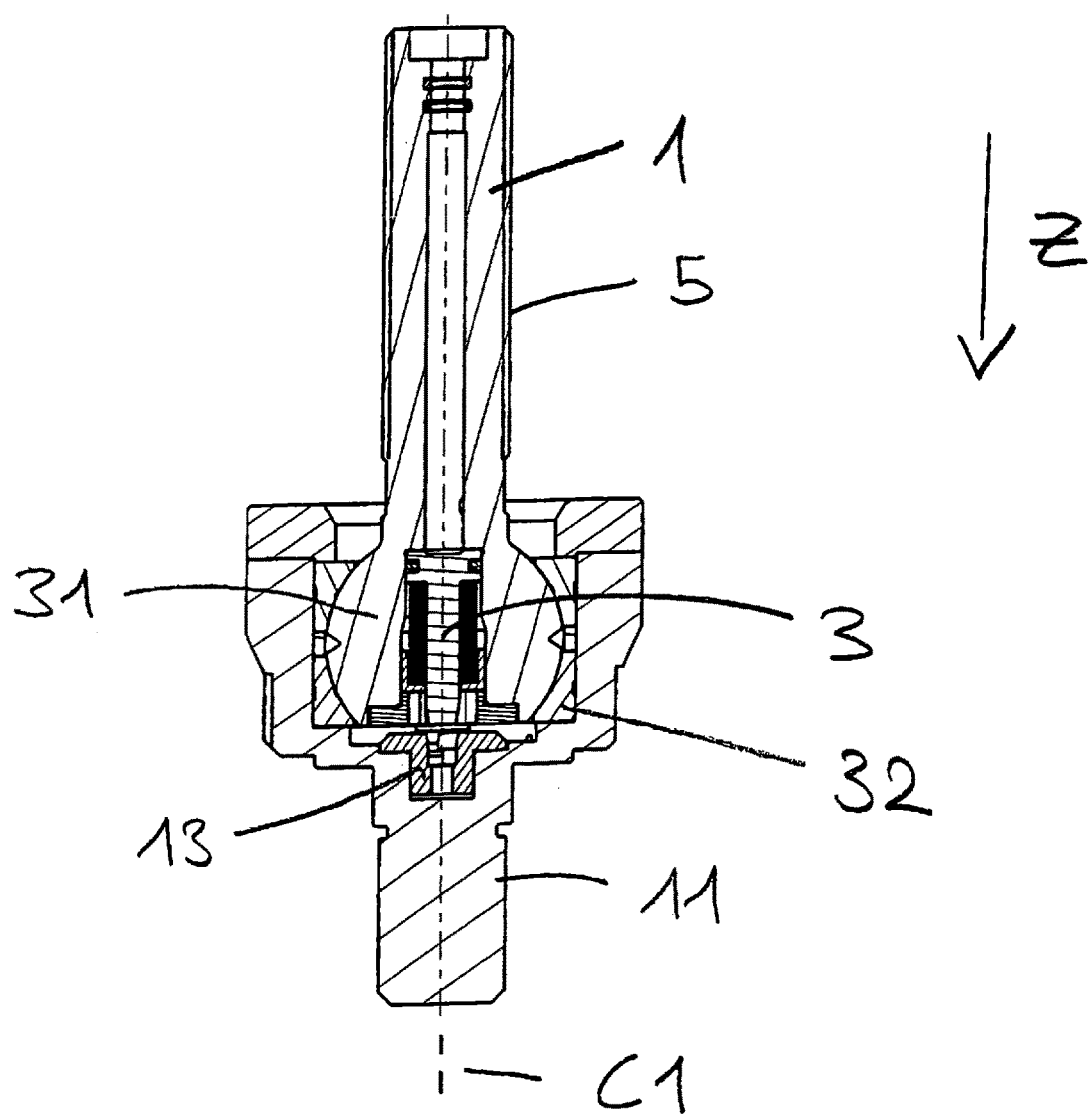

(51) Int. Cl.
*B23F 23/12* (2006.01)
*B23Q 5/20* (2006.01)

(52) U.S. Cl.
CPC ............ *B23F 23/1287* (2013.01); *B23Q 5/20* (2013.01); *Y10T 409/105565* (2015.01); *Y10T 409/107155* (2015.01); *Y10T 409/109063* (2015.01)

(58) Field of Classification Search
CPC . Y10T 409/105565; Y10T 409/105883; Y10T 409/106042; Y10T 409/10636; Y10T 409/106519; Y10T 409/107155; Y10T 409/109063; B23F 5/12; B23F 5/16; B23F 9/04; B23F 9/06; B23F 23/12; B23F 23/1287
See application file for complete search history.

(56) References Cited

U.S. PATENT DOCUMENTS

| | | | | |
|---|---|---|---|---|
| 2,069,323 A | * | 2/1937 | Miller | ........................ B23F 5/16 409/36 |
| 2,129,858 A | * | 9/1938 | Miller | ........................ B23F 5/16 409/34 |
| 2,364,065 A | | 12/1944 | Frederichs | |
| 2,596,343 A | * | 5/1952 | Miller | ................. B23F 23/1287 409/34 |
| 3,587,384 A | | 6/1971 | Ditschier | |
| 4,125,056 A | | 11/1978 | Tlaker et al. | |
| 4,487,535 A | * | 12/1984 | Johnson | .................... B23F 5/16 409/58 |
| 4,514,119 A | * | 4/1985 | Izumo | ....................... B23F 5/16 409/58 |
| 4,606,682 A | * | 8/1986 | Miller | ....................... B23F 5/16 409/19 |

FOREIGN PATENT DOCUMENTS

| | | | | |
|---|---|---|---|---|
| GB | 13139-1899 A | | 5/1900 | |
| JP | 54102689 A | * | 8/1979 | |
| JP | 61086126 A | * | 5/1986 | ............... B23F 5/16 |
| JP | 03178718 A | * | 8/1991 | |
| JP | 07115257 B2 | * | 12/1995 | ............... B23F 5/16 |
| JP | 2014166671 A | * | 9/2014 | |
| WO | WO 2015146661 A1 | * | 10/2015 | .......... B23F 23/1218 |

OTHER PUBLICATIONS

Search Report of German Patent and Trademark Office for DE Appln. No. 102014011145.8, dated Apr. 8, 2015, 7 pgs.
International Search Report and Written Opinion for PCT/EP2015/001468, RO/EPO, dated Oct. 15, 2015, 12 pgs. and English translation thereof (11 pgs.).

* cited by examiner

MACHINE FOR MACHINING WORKPIECES, CORRESPONDING ARRANGEMENT AND METHOD FOR MACHINING WORKPIECES

The invention relates to a machine for machining the toothing of workpieces, in particular a gear shaper, comprising a spindle for receiving a machining tool, and a drive, by means of which the spindle can be driven so as to rotate about the spindle axis thereof, as well as an arrangement for a machine of this type and a method for machining workpieces.

In terms of the fundamental design and the machine axes and functions, an example of such a machine in the form of a gear shaper is shown in images 7.2-3 and 7.2-4 on pages 290/291 of the textbook "Innovative Zahnradfertigung" [Innovative Gear Manufacturing] by Thomas Bausch, 3rd edition. The main cutting movement during gear shaping thus occurs by means of linear oscillation of the tool, for example a straight-toothed or helical-toothed shaper cutter, the machining taking place by means of generative coupling of tool and workpiece. The principle and the fundamental mode of operation of gear shapers are known to a person skilled in the art, and the application contains no further explanations regarding this, but instead refers to the literature specified above.

The gear shaper is to be appropriately adjusted according to the dimensions of the workpiece toothing to be cut. Relevant adjustment functions for this are the stroke position adjustment and the stroke length adjustment. In this way, the work area can be opened in order to adjust the stroke position or the stroke length, and the reciprocating spindle can be shifted after the fixing screws of a holding mechanism of the reciprocating spindle have been released. This requires some experience and skill on the part of the machine operating personnel carrying out the adjustment. Furthermore, a conventional machine of this kind has the disadvantage that the maximum values for the stroke position and stroke length adjustment are mutually restricting.

This problem of mutual restriction of stroke position and stroke length adjustment has been solved in the art by the introduction of a shaping head slide, i.e. by the introduction of an additional linear axis in the Z direction, in which the entire shaping head can be moved in the work area. Due to the stroke position and stroke length adjustment being independent of one another, in this machine the stroke length provided by the machine is available over the entire movement range. An example of a gear shaper of this kind comprising a shaping head slide is shown in image 7.2-2 on page 289 of the above-mentioned literature.

An additional advantage of the shaping head slide provided is also that, even if the presently machined workpiece batch requires no change in stroke length or stroke position, the stroke position can also be adapted without influencing the stroke length when the axial dimension of the shaper cutter has changed due to the shaper cutter being resharpened.

The object of the invention is that of developing a machine of the type mentioned at the outset, such that a machine is provided which is satisfactory in terms of both structural simplicity and high machining quality.

This object is achieved by the invention, in terms of the device, by means of a development of the machine which is substantially characterised by an arrangement upon the actuation of which the axial relative position of the spindle with respect to the spindle axis is changed by means of a spindle rotation caused by the drive.

The machine according to the invention thus makes it possible, for example, for a new stroke position adjustment to be caused by the spindle drive itself after a tool change has been made for the purpose of tool resharpening. The stroke position adjustment thus occurs by means of a motor, in particular by means of CNC, such that a high degree of adjustment accuracy can be achieved. In particular, this is no longer dependent on the experience or manual skill of the operating personnel of the machine. It is also possible for the shaping head slide to be omitted without there being a reduction in accuracy of the stroke position adjustment. Although the advantageous principle explained above of the independence of stroke position and stroke length adjustment is abandoned, a machine is achieved that is structurally different and simpler in portions. It is therefore in particular provided for the machine to not comprise a shaping head slide.

Moreover, it is preferably provided for the relative position movement achieved in the manner according to the invention to be no more than 10 cm, preferably no more than 7 cm, in particular no more than 4 cm, and certainly no more than 3 cm. In this way, the overall stability of the system increases, since the spindle does not protrude from the shaping head more than necessary beyond the last positioning point.

In a particularly preferred embodiment, the arrangement comprises a first part which, upon actuation, is connected to the spindle for conjoint rotation. The arrangement can therefore assume at least two settings: a first setting in which the first part is not connected to the spindle for conjoint rotation, and a second setting in which this connection for conjoint rotation is produced. A transition from the first to the second setting thus occurs when the arrangement is actuated.

In a particularly preferred embodiment, the first part comprises an axial cut-out or hole, in which a for example axially movable pin is guided, which pin is coupled to the first part for conjoint rotation, and by means of the in particular hydraulically or pneumatically actuable movement of which it is possible to produce the connection of the first part to the spindle for conjoint rotation, in particular by means of a positive connection. In this way, the actuation is achieved in a particularly simple manner from a design point of view, while maintaining a compact machine.

In a particularly preferred embodiment, the arrangement comprises a second part, the connection of which to the first part for conjoint rotation is released upon actuation. In the first setting of the arrangement there is thus a connection for conjoint rotation, whereas in the second setting a relative rotation between the first and second part is possible. If, additionally, there is a connection between the first part and the spindle for conjoint rotation in the second setting, the first part of the arrangement can be rotated relative to the second part of the arrangement by means of the spindle drive.

In a particularly preferred embodiment, the first and/or the second part comprises a thread, and the second and/or the first part comprises a counterpart that is guided by the thread. In this way, a rotational movement of the first part leads to the axial relative movement thereof with respect to the second part and thus to a relative movement of the spindle, having axial direction components, with respect to a specified fixed point on the spindle axis when the arrangement is in the second setting.

In a preferred embodiment, the first part comprises an external thread and the second part comprises an internal thread that is matched thereto. This allows for a compact design and in particular creates space for the axially movable pin described above. In this context, it can also be expediently provided for a device for releasing the pressure-resistant connection between the first and the second part to act in a hydraulic or pneumatic manner. The device producing the pressure-resistant connection between the first and the second part can, for example, be provided by means of pre-tensioned threaded clamps, for example using disc springs.

Two couplings are thus preferably provided, a (first) coupling which, when coupled, produces a connection between the first and the second part of the arrangement for conjoint rotation and which, when uncoupled, allows for mutual relative rotation of these parts, and a (second) coupling which, when coupled, produces a connection between the spindle and the first part for conjoint rotation and, when uncoupled, allows the first part to rotate separately from the spindle. In a first operating setting of the installation, which is provided for workpiece machining and in which the arrangement is not actuated, the first coupling is in the coupled state and the second coupling is in the uncoupled state. In contrast, when the arrangement is actuated the first coupling is in the uncoupled state and the second coupling is in the coupled state.

In a preferred embodiment, both the first and the second part are a functional element of a device, in particular a connecting rod arrangement, by means of which the spindle can carry out a reciprocating stroke motion. In this way, the arrangement is integrated in a compact manner into the machine design in order to perform the reciprocating motion.

Moreover, the invention also independently protects the arrangement according to the invention in terms of the device. The invention thus also relates to an arrangement for a machine tool, in particular a toothing machine, in which machining, in particular machining of workpiece toothing, can be carried out in a first setting of the arrangement using a machining tool that is mounted on a spindle of the machine tool, which spindle is driven by a motor so as to rotate about the spindle axis thereof, which machining is substantially characterised in that motorised rotation of the spindle in a second setting of the arrangement changes a relative position of a first part of the arrangement with respect to a second part of the arrangement in terms of a direction having components that are axial to the spindle axis.

Further features of the arrangement can be found in the aspects explained above. In particular, a transition from the first to the second setting of the arrangement corresponds to an actuation of the arrangement within the meaning of claim 1. The machining tool can preferably be a shaper cutter, and the machine preferably a gear shaper.

In terms of the method, the object is achieved by a method for machining workpiece toothing, in particular in the gear-shaping method, in which a spindle that is driven by a motor so as to rotate about a spindle axis is positioned axially with respect to the spindle axis, which method is substantially characterised in that the axial positioning of the spindle occurs by means of the motorised spindle drive.

The advantages of the method according to the invention can be found in the above-described advantages of the machine and arrangement according to the invention.

In particular, it can be provided for the axial positioning to occur after mounting a tool that has been altered with regard to the axial dimensions thereof compared with the previously mounted tool. This altered axial dimension can result from the previously mounted tool having been resharpened, or from another tool being coupled to the spindle in the meantime due to the necessary resharpening operation. In addition, an adjustment of the stroke position is preferably carried out together with the axial positioning.

Figure 2:
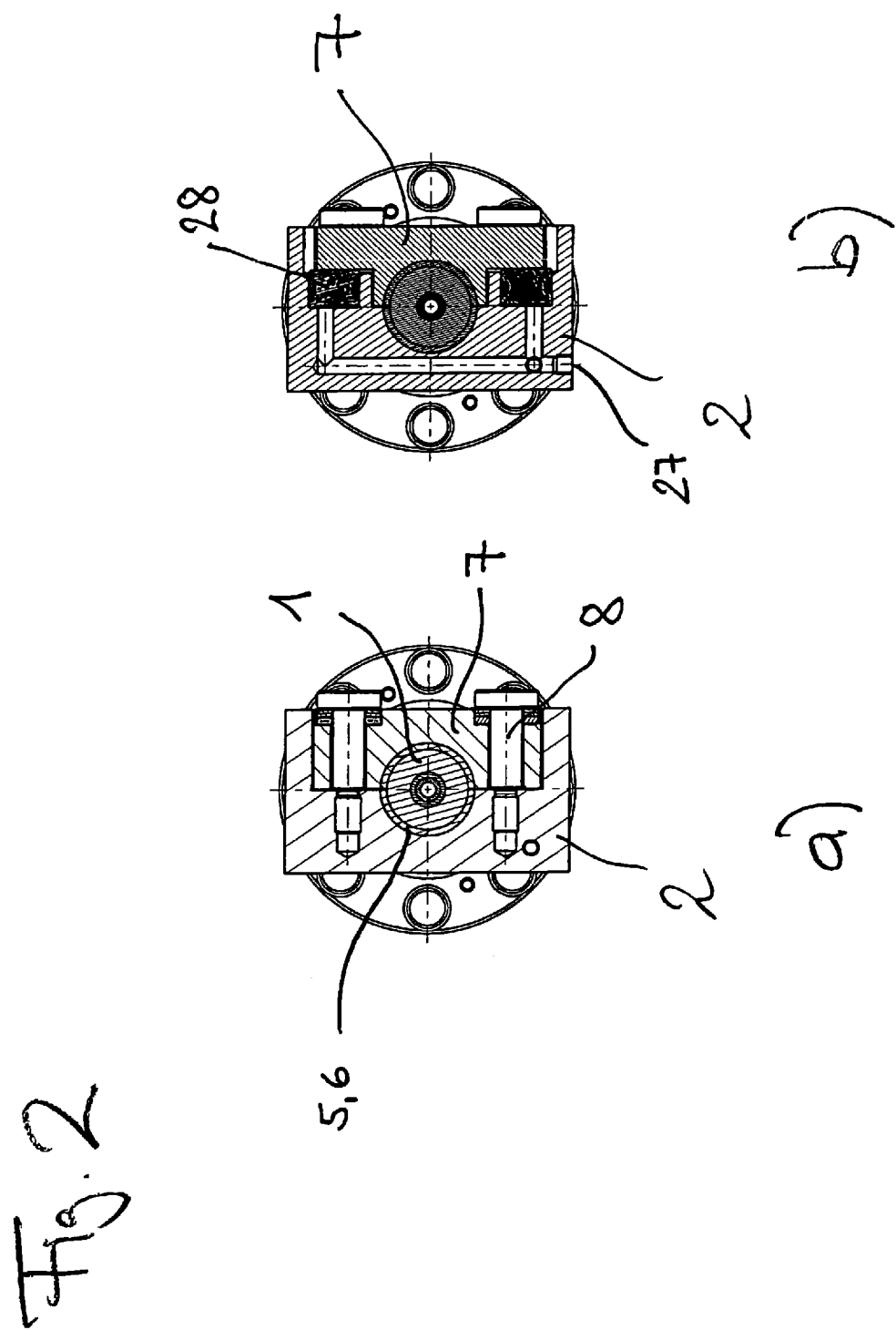
Figure 3:
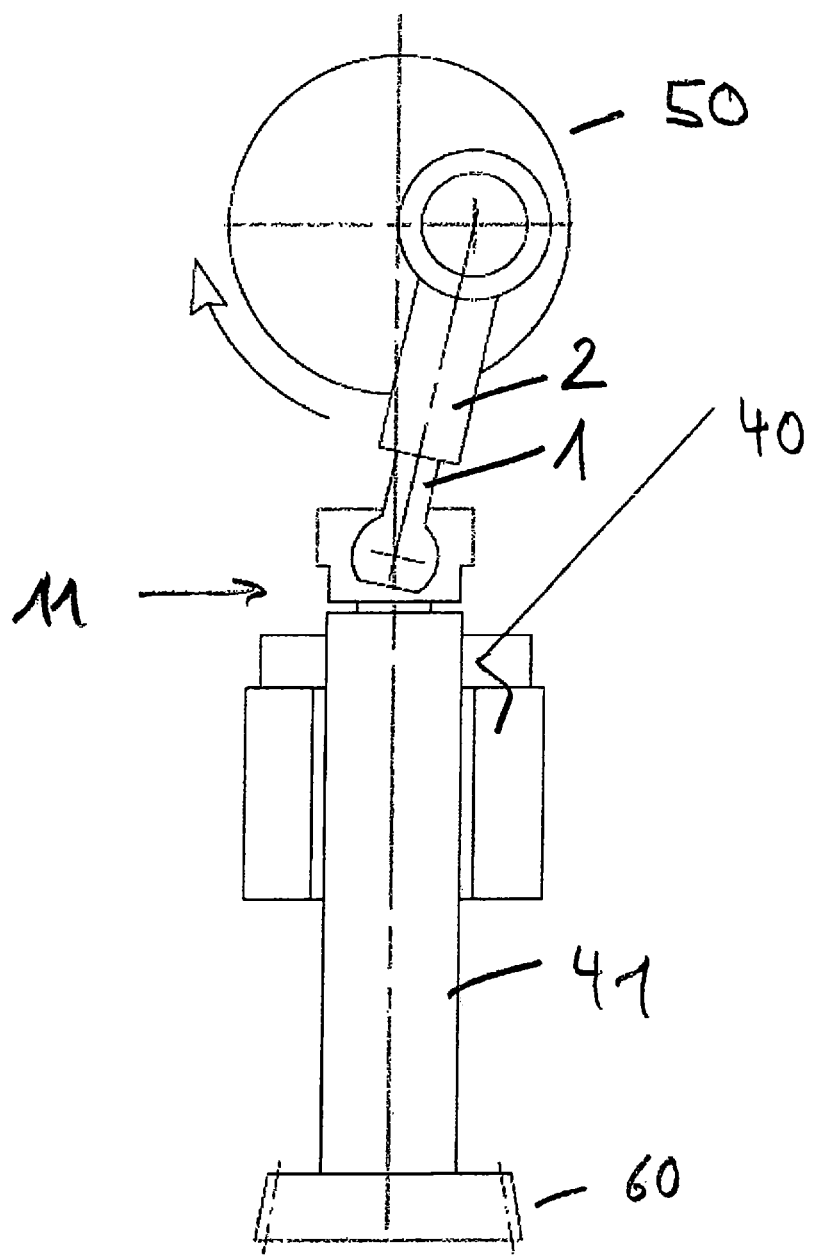
Figure 4:
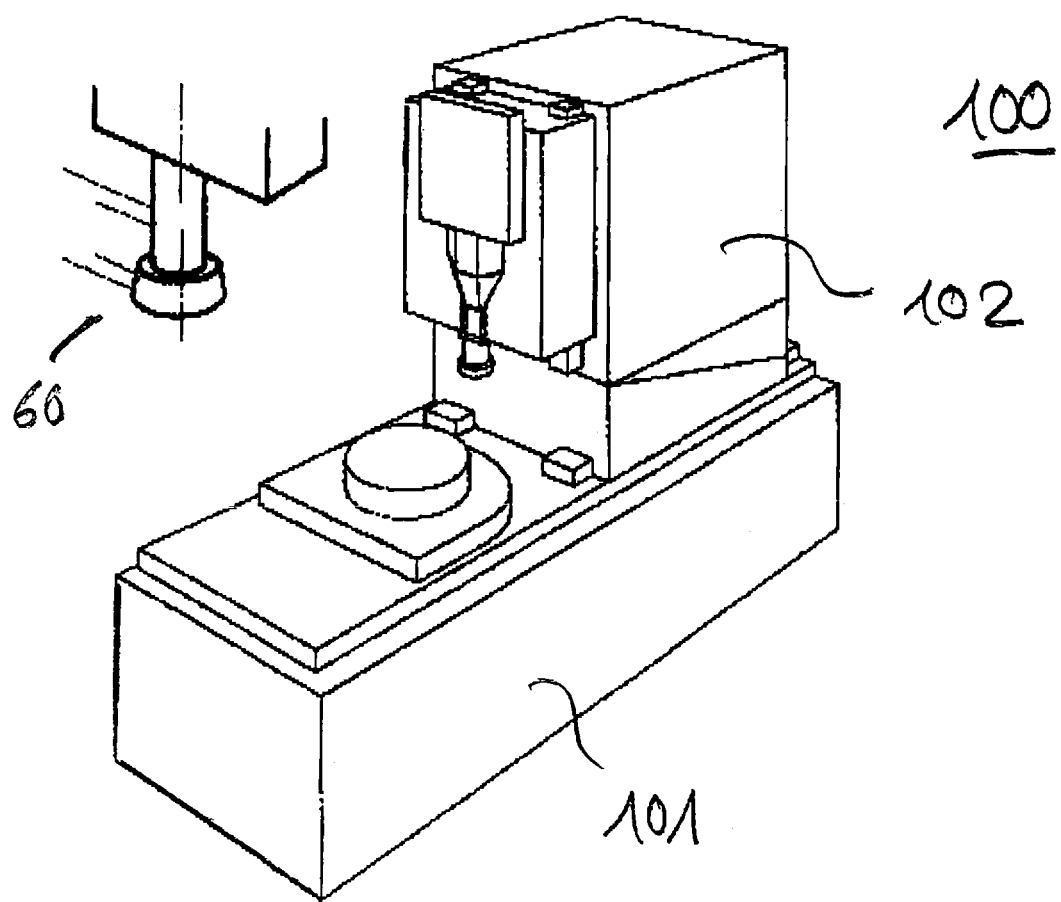

Further features, details and advantages of the invention can be found in the following description with reference to the accompanying drawings, in which:

FIG. 1 shows components of an arrangement according to the invention in axial section, FIG. 2A, 2B are explanatory cross sections of components of the arrangement, FIG. 3 is a schematic axial section of the spindle/crank mechanism coupling, and FIG. 4 schematically shows a possible design for a gear shaper.

FIG. 1 is an axial section of a region of an arrangement according to the invention that is relevant in order for the invention to be understood. It shows the coupling of a connecting rod arrangement to a spindle of a gear shaper, the connecting rod arrangement being used to perform a reciprocating stroke motion in the Z direction. A ball pin 1 is a component of the connecting rod arrangement, which ball pin is mounted in a ball socket 32 by means of a ball head 31, said ball socket being formed in a spindle end part 11 that is fixed to the (incompletely shown) tool spindle for conjoint rotation. A conical sleeve 13 is non-rotationally installed in a central cut-out of the spindle end part 11 facing the ball socket 32. If the spindle drive (not shown in FIG. 1) rotates, the spindle end part 11, the ball socket 32 and the sleeve 13 thus also rotate about the spindle axis C1.

The ball pin 1 is hollow and has a pin 3 that is movably guided in the region of the ball head 31. The conical front end of the pin 3 matches the taper of the sleeve 13. Furthermore, the pin 3 is rotationally coupled to the sleeve 13 in a positive manner when inserted into the sleeve 13, for example according to the principle of wedge and slot.

In a machining position, the pin 3 in the position shown in FIG. 1, i.e. uncoupled from the sleeve 13. In this position, the pin 3 is held in a pre-tensioned manner by a device 33, for example a spring device.

However, if pressure is applied, for example by means of a hydraulic fluid, from the rear side through the central opening in the ball pin 1, the pin 3 is pushed into the sleeve 13 and a connection between the ball pin 1 and the spindle end part 11 for conjoint rotation is thus produced. When the spindle drive rotates, so too does the ball pin 1.

The ball pin 1 is further provided with an external thread 5, by means of which it can be screwed into a matching internal thread 6 of a ball pin holder 2. This can be seen more clearly in FIG. 2A. In the machining position provided for gear shaping, however, the ball pin 1 cannot rotate in the ball pin holder 2, since the thread 5, 6 is clamped by a plurality of, for example three, threaded clamps 7. In this embodiment, this is achieved by means of a pin 8 under the influence of disc springs, for example. The pin 8 is not a screw pin, however. The threaded clamps 7 can instead be released by means of hydraulic actuation, i.e. a pressure is applied to a hydraulic fluid, through fluid channels 27 made in the ball pin holder 2, that is sufficient to lift the threaded clamps 7 off the ball pin holder 2 by means of pressure transfer parts 28. This can be seen in the sectional view in FIG. 2B.

In the operating position shown in FIGS. 1 and 2, the conjointly rotating ball pin 1 and ball pin holder 2 are therefore components of a connecting rod arrangement, which, however, are rotatably connected to the tool spindle by means of the ball joint 31, 32 in order to transfer forces in the stroke direction. In this operating position a gear-shaping process can be carried out in an otherwise conventional manner.

If both the above-described hydraulic systems are now operated starting from this operating position, a coupling between the tool spindle and the ball pin for conjoint rotation is achieved by means of coupling the conical pin 3 to the conical sleeve 13, and the connection of the ball pin 1 to the ball pin holder for conjoint rotation is released. As a result, a motorised rotation of the spindle causes the ball pin 1 to rotate as well and, on account of the threads 5, 6, provides for the ball pin 1 to bee unscrewed, for example, from the ball pin holder 2. In this setting, the stroke position of the tool spindle can be adjusted.

In a method according to the invention, gear-shaping machining for example takes place using a shaper cutter which needs to be resharpened after a specific working time. The new tool coupled to the toot spindle (or the old tool after being resharpened) has an axial dimension that is smaller, for example by $\Delta Z$, than the previously used tool, and therefore the stroke position is now wrongly set by $\Delta Z$ when the new shaper cutter is coupled.

The gear shaper of this embodiment has no shaping head slide, by means of which such a stroke position error of $\Delta Z$ would be easily corrected. Instead, the hydraulic systems are now actuated, i.e. the gear-shaping operating state is switched to the stroke position adjustment state. Due to the known thread data of the thread 5, 6, the controller of the CNC-controlled gear shaper can determine how much the ball pin 1 must rotate in the ball pin holder 2 in order for the stroke position to be compensated by $\Delta Z$, and can accordingly actuate the CNC-controlled spindle drive of the tool spindle coupled to the ball pin 1 in this operating position, such that said spindle drive rotates about an angle corresponding to the stroke position correction $\Delta Z$.

In this embodiment, a maximum achievable stroke position alteration is limited, in this manner, to approximately 20 mm for stability reasons. This allows shaper cutters to be resharpened several times and for them to be used in the gear shaper in a manner suited to the stroke position. The stroke position is adjusted, as described above, by means of CNC, i.e. automatically after input of an actuation signal, and thus to a very high degree of precision even though the gear shaper has no shaping head slide that can be actuated by means of a motor.

FIG. 3 shows the relationship of the arrangement according to the invention to a crank mechanism (50) via a connecting rod arrangement 1, 2, and to the spindle 41 that is driven by the spindle drive 40 and carries the shaper cutter 60, the end part 11 of which spindle is coupled to the ball pin 1, in a typical snapshot in the working position. It can be seen that, in contrast, the axis of the ball pin 1 coincides with the spindle axis in the operating position for stroke length adjustment.

FIG. 4 shows another typical design of a gear shaper 100 having a tower 102 supporting the shaping head on a machine bed 101, on which the arrangement can be positioned, even though a shaping head slide is not necessary according to the invention.

The invention is not restricted to the features shown in the drawings. Rather, the individual features disclosed in the description and the subsequent claims can, individually or in combination, be essential for realising the invention in its various embodiments.

The invention claimed is:

1. Gear shaping machine for machining the teeth of workpieces, said machine comprising:
   a tool spindle (11, 41) for receiving a machining tool (60),
   a drive (40), by means of which the tool spindle can be driven so as to rotate about the spindle axis (C1) thereof,
   a stroke position adjustment arrangement, said arrangement being operable to change the axial relative position of the tool spindle with respect to the tool spindle axis, said change being effected by means of a tool spindle rotation caused by said drive.

2. Gear shaping machine according to claim 1, wherein the arrangement comprises a first part (1) which, upon actuation of said stroke position adjustment arrangement, is connected to the spindle for conjoint rotation.

3. Gear shaping machine according to claim 2, wherein the first part (1) comprises an axial cut-out in which an axially movable coupling part in the form of a pin (3) is guided, which coupling part is connected to the first part for conjoint rotation, it being possible for the connection of the first part to the spindle for conjoint rotation to be produced by means of hydraulically or pneumatically actuable movement of said pin by means of a positive connection of said pin with said spindle.

4. Gear shaping machine according to claim 2 wherein the arrangement comprises a second part (2), the connection of which to the first part for conjoint rotation being a pressure-resistant connection, said connection being released upon actuation of said stroke position adjustment arrangement.

5. Gear shaping machine according to claim 4, wherein one of the first and the second part comprises a thread (5, 6) and the other of the second and the first part comprises a counterpart that is guided by the thread.

6. Gear shaping machine according to claim 4 wherein the first part (1) comprises an external thread (5) and the second part (2) comprises a matching internal thread (6).

7. Gear shaping machine according to claim 4 wherein a device for releasing the pressure-resistant connection between the first and the second part acts in a hydraulic or pneumatic manner, and one or more pre-tensioned threaded clamps (7) are thereby released from the device.

8. Gear shaping machine according to claim 4 wherein the first and the second part are functional elements of a connecting rod arrangement, by means of which the spindle can carry out a reciprocating stroke motion.

9. In a gear shaping method for machining the teeth of workpieces, the improvement comprising:
   driving a spindle by a motor so as to rotate the spindle about a spindle axis, and
   positioning said spindle axially with respect to the spindle axis,
   characterised in that the axial positioning of the spindle is achieved by means of the motorized spindle drive.

10. Gear shaping method according to claim 9, wherein the axial positioning occurs after mounting a tool that has been altered in terms of the axial dimension thereof relative to the previously mounted tool.

* * * * *